United States Patent
Shibata

(10) Patent No.: US 9,372,650 B2
(45) Date of Patent: Jun. 21, 2016

(54) COMMUNICATION CONTROL METHOD IN IMAGE FORMING SYSTEM WHICH COMPRISES A PLURALITY OF APPLICATIONS AND AN IMAGE FORMING APPARATUS AND IN WHICH AT LEAST A PRINT JOB DESCRIBED IN JDF CODE IS TRANSMITTED FROM SAID APPLICATIONS TO SAID IMAGE FORMING APPARATUS AND A MESSAGE DESCRIBED IN JMF CODE IS EXCHANGED BETWEEN SAID APPLICATIONS AND SAID IMAGE FORMING APPARATUS, STORAGE MEDIUM STORED WITH PROGRAM FOR SAID IMAGE FORMING SYSTEM, AND SAID IMAGE FORMING SYSTEM

(71) Applicant: KONICA MINOLTA, INC., Chiyoda-ku (JP)

(72) Inventor: Kuniyasu Shibata, Kawasaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/597,559

(22) Filed: Jan. 15, 2015

(65) Prior Publication Data
US 2015/0205554 A1    Jul. 23, 2015

(30) Foreign Application Priority Data
Jan. 17, 2014    (JP) .................................. 2014-006883

(51) Int. Cl.
G06F 3/12    (2006.01)

(52) U.S. Cl.
CPC ............ *G06F 3/1257* (2013.01); *G06F 3/1207* (2013.01); *G06F 3/1209* (2013.01); *G06F 3/1244* (2013.01); *G06F 3/1285* (2013.01); G06F 3/121 (2013.01); G06F 3/1259 (2013.01)

(58) Field of Classification Search
None
See application file for complete search history.

(56) References Cited

U.S. PATENT DOCUMENTS

| | | | |
|---|---|---|---|
| 8,508,768 B2* | 8/2013 | Sekine | G06Q 10/10 358/1.1 |
| 2004/0073684 A1 | 4/2004 | Jodra et al. | |
| 2010/0149565 A1 | 6/2010 | Mori | |

FOREIGN PATENT DOCUMENTS

| | | |
|---|---|---|
| EP | 2 492 800 A2 | 8/2012 |
| JP | 2013-88992 A | 5/2013 |

OTHER PUBLICATIONS

Machine translation of Japanese Appl. No. 2013-088992 published May 2013.*
Extended European Search Report dated Jul. 15, 2015, issued by the European Patent Office in the corresponding European Application No. 15150807.4. (7 pages).

* cited by examiner
(Continued)

*Primary Examiner* — Paul F Payer

(74) *Attorney, Agent, or Firm* — Buchanan Ingersoll & Rooney PC

(57) ABSTRACT

A communication control method in an image forming system according to the present invention includes a step (a) of specifying an application based on the description of a print job or the like transmitted from any of applications to an image forming apparatus, a step (b) of managing the rules of describing the print job for dynamic value including any values assigned per print job, which are added to the print job, per application together with operations associated with the dynamic values, and a step (c) of recognizing the dynamic value by analyzing the print job according to the rules managed in the step (b) for the application specified in the step (a) for the print job, and performing the operations associated with the dynamic value for the dynamic value.

12 Claims, 18 Drawing Sheets

FIG.5A

| Path | Value | Application Name |
|---|---|---|
| JMF/@SenderID | VendorA | VendorA |
| JDF/AuditPool/Created/@AgentName | VendorB | VendorB |
| JDF/AuditPool/Created/@AgentVersion | 1.0.* | |

FIG. 5B

```
<JMF xmlns=http://www.CIP4.org/JDFSchema_1_1 Version="1.3" SenderID="VendorA" >     ← (1)
    <Command ID="ID20120303154611" Type="SubmitQueueEntry" xsi:type="CommandSubmitQueueEntry" >     ← (2)
        <QueueSubmissionParams URL="http://192.168.100.100/pdf/A4Port.jdf" />
    </Command>                                                                      ↙ (3)
</JMF>
```

FIG.6A

| Item | Path | Operation |
|---|---|---|
| ResponseStatus | JMF/Response/DeviceInfo/@StatusDetal | Replace Value with "No Paper" |
| CommandSubmitQueueEntry | JMF/Command/QueueSubmissionParams/ | Add @Hold="true" |

FIG.6B

| Path | Condition and Operation |
|---|---|
| JDF/ResourceLinkPool/ComponentLink/@CombinedProcessIndex | If @CombinedProcessIndex=="0" and @Usage="Output", Delete Attributes and Values of CombinedProcessIndex and Usage |
| JDF/ResourceLinkPool/ComponentLink/@Usage | |

FIG. 7A

```
<?xml version="1.0" encoding="UTF-8"?>
<JMF xmlns=http://www.CIP4.org/JDFSchema_1_1 Version="1.3" SenderID="VendorX"
 xmlns:xsi="http://www.w3.org/2001/XMLSchema-instance">
  <Response ID="ID20120303154611" Type="Status" refID="20120303154611"
   xsi:type="ResponseStatus">
    <DeviceInfo StatusDetails="Ready" DeviceStatus="Idle" DeviceCondition="OK" />
  </Response>
</JMF>
```

FIG. 7B

```
<?xml version="1.0" encoding="UTF-8"?>
<JMF xmlns=http://www.CIP4.org/JDFSchema_1_1 Version="1.3" SenderID="VendorX"
 xmlns:xsi="http://www.w3.org/2001/XMLSchema-instance">
  <Response ID="ID20120303154611" Type="Status" refID="20120303154611"
   xsi:type="ResponseStatus">
    <DeviceInfo StatusDetails="No Paper" DeviceStatus="Idle" DeviceCondition="OK" />
  </Response>
</JMF>
```

| Item | Path | Dynamic Value | Operation |
|---|---|---|---|
| SignalStatus | JDF/ | %JobID% | Store Dynamic Value |
| ResponseStatus | JDF/ | %JobPart% | Store Dynamic Value |
| | | | |

FIG.8B

| Item | Path | Dynamic Value | Operation |
|---|---|---|---|
| SignalStatus | JDF/ | %JobID% | Add Dynamic Value to JMF/Signal/DeviceInfo/ |
| ResponseStatus | JDF/ | %JobPart% | Add Dynamic Value to JMF/Response/DeviceInfo/ |
| | | | |

FIG.8C

| Dynamic Value | Value | Internal Job ID |
|---|---|---|
| %JobID% | ID_A1 | 1 |
| %JobID% | ID_A2 | 2 |
| | | |

```
<?xml version="1.0" encoding="UTF-8"?>
<JDF Activation="Active" Category="DigitalPrinting" JobID="ID_A1" JobPartID="PartID_A1"
...
<ResourcePool>
  <RunList Class="Parameter" ID="r090407_065624623_030063" Status="Available">
    <RunList Pages="0 ~ -1"
    <LayoutElement>
      <Filespec MimeType="application/pdf" URL="http://192.168.100.100/pdf/A4Port.pdf" />
    </LayoutElement>
  </RunList>
</RunList>
...
</ResourcePool>
<ResourceLinkPool>
  <ComponentLink CombinedProcessIndex="0" Amount="5" Usage="Output" />
  <RunListLink CombinedProcessIndex="0 1" ProcessUsage="Document"
       Usage="Input" rRef="r090407_065624623_030063" />
...
</ResourceLinkPool>
<AuditPool>
  <Created AgentName="VendorB" AgentVersion="1.0.0" />
</AuditPool>
</JMF>
```

```
<?xml version="1.0" encoding="UTF-8"?>
<JMF xmlns=http://www.CIP4.org/JDFSchema_1_1 Version="1.3" SenderID="VendorX"
    xmlns:xsi="http://www.w3.org/2001/XMLSchema-instance">
    <Signal ID="ID201203031546l1" Type="Status" refID="201203031546l1"
        xsi:type="SignalStatus">
        <DeviceInfo StatusDetails="Ready" DeviceStatus="In Progress" DeviceCondition="OK" />
    </Signal>
</JMF>
```

FIG. 10B

```
<?xml version="1.0" encoding="UTF-8"?>
<JMF xmlns=http://www.CIP4.org/JDFSchema_1_1 Version="1.3" SenderID="VendorX"
    xmlns:xsi="http://www.w3.org/2001/XMLSchema-instance">
    <Signal ID="ID201203031546l1" Type="Status" refID="201203031546l1"
        xsi:type="SignalStatus">
        <DeviceInfo StatusDetails="Ready" DeviceStatus="In Progress" DeviceCondition="OK"
            JobID="ID_A1" />
    </Signal>
</JMF>
```

FIG. 11A

```
<?xml version="1.0" encoding="UTF-8"?>
<JMF xmlns=http://www.CIP4.org/JDFSchema_1_1" SenderID="VendorA"
xmlns:xsi="http://www.w3.org/2001/XMLSchema-instance">
  <Query ID="20120303154611" Type="Status" xsi:type="QueryStatus">
    <Subscription URL="http://192.168.100.100/jmf" />
    <StatusQuParams DeviceDetails="Brief" />
  </Query>
</JMF>
```

FIG. 11B

| Status Notification URL | Application Name |
|---|---|
| http://192.168.100.100/jmf | VendorA |
| http://192.168.100.101/jmf | VendorB |

COMMUNICATION CONTROL METHOD IN IMAGE FORMING SYSTEM WHICH COMPRISES A PLURALITY OF APPLICATIONS AND AN IMAGE FORMING APPARATUS AND IN WHICH AT LEAST A PRINT JOB DESCRIBED IN JDF CODE IS TRANSMITTED FROM SAID APPLICATIONS TO SAID IMAGE FORMING APPARATUS AND A MESSAGE DESCRIBED IN JMF CODE IS EXCHANGED BETWEEN SAID APPLICATIONS AND SAID IMAGE FORMING APPARATUS, STORAGE MEDIUM STORED WITH PROGRAM FOR SAID IMAGE FORMING SYSTEM, AND SAID IMAGE FORMING SYSTEM

CROSS-REFERENCE TO RELATED APPLICATION

This application is based on Japanese Patent Application No. 2014-006883 filed on Jan. 17, 2014, the contents of which are incorporated herein by reference.

BACKGROUND

1. Technical Field

The present invention relates to a communication control method in an image forming system, a storage medium stored with a program for the image forming system, and the image forming system.

2. Description of Related Art

In general, JDF (Job Definition Format) is employed as a standard format for describing print setting in a print job which is an instruction in a print step. JMF (Job Messaging Format) is employed as a format for describing a message exchanged between apparatuses in the print step.

JDF and JMF are standard specifications, but can be allowed to take a plurality of expressions for describing functions and others. For example, JDF can be allowed to take a plurality of expressions for setting the number of copies in the print setting. Therefore, the description in JDF needs to be analyzed by correcting software etc., per application to which an image forming apparatus is connected in order to perform proper printing in the image forming apparatus.

A conventional technique for solving the problem is described in Unexamined Japanese Patent Publication No. 2013-88992. That is, JDF analysis data per application is stored in a server, and an image forming apparatus specifies an application based on the description of a received print job, and acquires the JDF analysis data for analyzing the specified application from the server. Then, the description in JDF of the print job is analyzed by the acquired JDF analysis data. Thereby, proper printing is enabled for each application, and software in the image forming apparatus does not need to be corrected or changed etc., along with an increase in applications.

SUMMARY

When a message in JMF is transmitted from the image forming apparatus to an application which transmits the print job in JDF, whether a dynamic value defined per print job after a job entry such as job ID can be added to JMF or not depends on an application. In other words, an application capable of transmitting a message in JMF to the print job per print job by adding the dynamic value to JMF is present, while an application which has possibilities of hanging up by adding the dynamic value to JMF is present.

The conventional technique cannot add the dynamic value which is changing per print job to JMF and cannot switch addition of the dynamic value per application, and in order to achieve that, software which is operating in the image forming apparatus needs to be corrected.

The present invention has been made in order to solve the problems. That is, an application is specified based on the print job or the like transmitted by any of a plurality of applications, and the rules of describing the print job for dynamic values added to the print job is managed together with operations associated with the dynamic values per application. Then, the print job is analyzed according to the rules managed for the specified application so as to recognize the dynamic values, and the operations associated with the recognized dynamic values are performed. Thereby, addition of a dynamic value such as job ID etc., to a message in JMF can be rapidly and easily switched per application which transmits the print job without correcting software in the image forming apparatus.

To achieve at least one of the abovementioned objects, a communication control method in an image forming system reflecting one aspect of the present invention comprises the followings (1) A communication control method in an image forming system which comprises a plurality of applications and an image forming apparatus and in which at least a print job described in JDF code is transmitted from the applications to the image forming apparatus and a message described in JMF code is exchanged between the applications and the image forming apparatus, the method comprising the steps of: (a) specifying an application based on a description of at least one of the print job and the message associated with the print job, transmitted from any of the applications to the image forming apparatus; (b) managing rules of describing the print job for dynamic value including any values assigned per print job, which is added to the print job, per application together with operations associated with the dynamic value; and (c) recognizing the dynamic value by analyzing the print job according to the rules managed in the step (b) for the application specified in the step (a) for the print job, and performing the operations associated with the dynamic values managed in the step (b) for the recognized dynamic value.

(2) The communication control method in the image forming system as described in above (1), further comprising: a step (d) of managing the dynamic value recognized in the step (c), wherein the operations performed in the step (c) comprise: an operation of, when at least one of the print job and the message associated with the print job is received by the image forming apparatus, storing and managing the dynamic values recognized in the step (c) in the step (d); and an operation of, when the message for response or notification to the print job is transmitted to the application specified in the step (a), adding the dynamic values managed in the step (d) to the message to the print job.

(3) The communication control method in the image forming system as described in above (2), wherein a unique internal job ID is further given to each of the dynamic values recognized in the step (c) and the dynamic values are managed in combination with the internal job IDs given to the dynamic values in step (d), and wherein the operations performed in the step (c) comprise: an operation of, when at least one of the print job and the message associated with the print job is received by the image forming apparatus, storing and managing the dynamic value recognized in the step (c) in combination with the internal job ID in the step (d); and an operation of, when the message for response or notification to the print job is transmitted to the application specified in the step (a), adding the dynamic value to the message to the print job when a combination of the dynamic value recognized from the print job and the internal job ID given to the dynamic value matches with the combination managed in the step (d).

(4) The communication control method in the image forming system as described in above (1), further comprising: a step (e) of managing rules of describing the message for static value which is fixed value per application together with operation associated with the static value, wherein when the message for response or notification to the print job is transmitted to the application specified in the step (a), the operations managed in the step (e) for the specified application are further performed according to the rules in the step (c).

(5) The communication control method in the image forming system as described in above (4), further comprising: a step (f) of managing an association between rules of describing the print job or the message associated with the print job in order to specify the application and the application, wherein at least one of the print job and the message associated with the print job is analyzed according to the rules managed in the step (f) so as to specify the application in the step (a), and the rules and the operations are stored and independently managed in a non-volatile storage medium in the step (b), the step (e) and the step (f).

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 5A shows an application specification table, and FIG. 5B shows an exemplary message transmitted from the information processing apparatus to the image forming apparatus.

FIG. 6A and FIG. 6B are the explanatory diagrams of static tables.

FIG. 7A shows a message template, and FIG. 7B shows an exemplary message processed by an operation associated with a static value by a static table control unit according to a JDF dynamic table.

FIG. 8A is an explanatory diagram of a dynamic table, and FIG. 8B is an explanatory diagram of a dynamic table, and FIG. 8C is an explanatory diagram of a table associating the job ID which is dynamic value with an internal job ID.

FIG. 9 is a diagram showing an exemplary print job described in JDF.

FIG. 10A shows a message template, and FIG. 10B shows a message processed by the operation associated with the static value by the static table control unit according to a JMF dynamic table.

FIG. 11A shows an exemplary message for transmitting a status notification URL from the information processing apparatus to the image forming apparatus, and FIG. 11B shows a status notification URL/application association table.

DETAILED DESCRIPTION

The communication control method in the image forming system according to an embodiment of the present invention, the storage medium stored with the program for the image forming system, and the image forming system will be described below in detail with reference to the drawings.

The terms "JDF code" and "JMF code" will be simply denoted as "JDF" and "JMF" in the specification, respectively.

Figure 1:
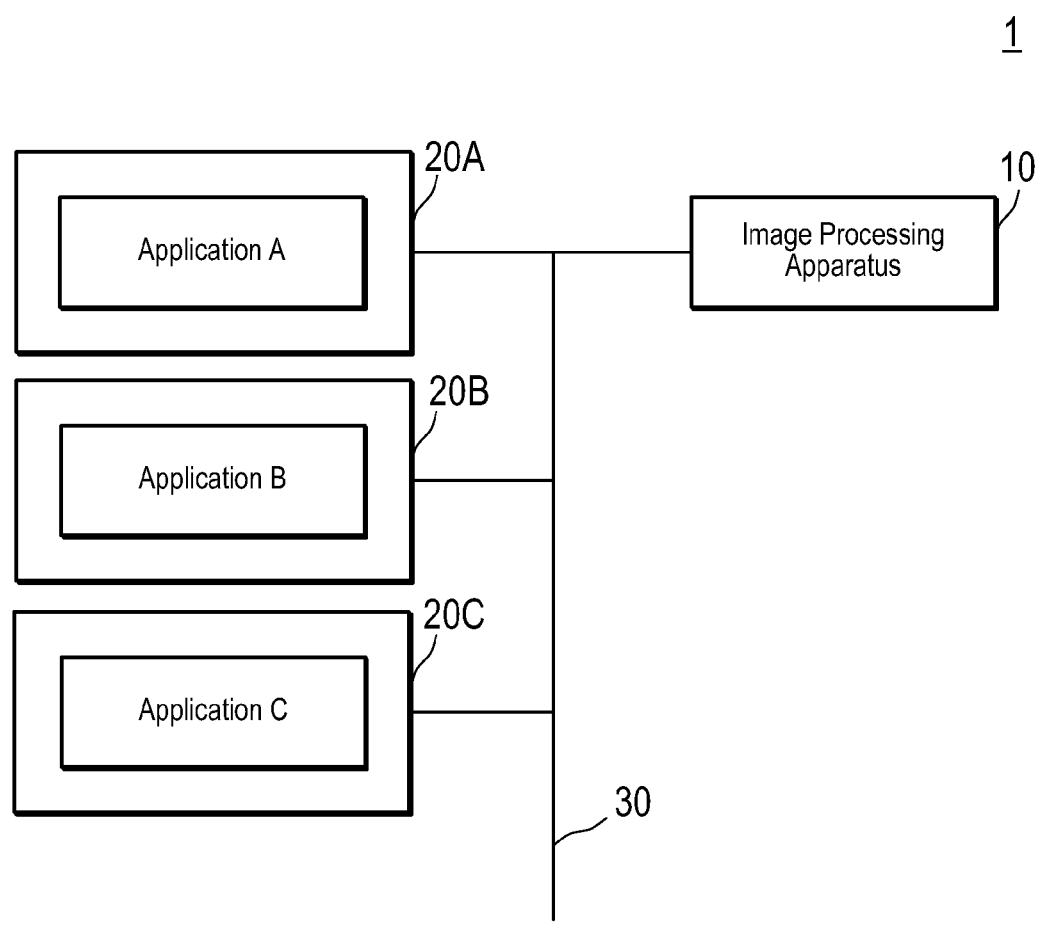
FIG. 1 is a block diagram showing the image forming system according to an embodiment of the present invention.

FIG. 1 is the block diagram showing the image forming system according to the embodiment of the present invention.

As shown in FIG. 1, the image forming system 1 includes a plurality of information processing apparatuses 20A, 20B and 20C, and an image forming apparatus 10.

The information processing apparatuses 20A, 20B and 20C, and the image forming apparatus 10 are connected via a network 30 to be mutually communicable. The network 30 may be configured of LAN (Local Area Network) consisting of computers or network devices connected by the standard such as Ethernet (trademark), token ring, or FDDI (Fiber-Distributed Data Interface), or WAN (Wide Area Network) consisting of LANs connected via a dedicated line.

Application A, application B, and application C for generating and transmitting the print job described in JDF (which will be simply called "print job" below) and a message described in JMF (which will be simply called "message" below) operate on the information processing apparatus 20A, the information processing apparatus 20B, and the information processing apparatus 20C, respectively. Each application A, B or C transmits the generated print job and the message to the image forming apparatus 10.

The print job is a general term of print instructions for the image forming apparatus 10, and includes a job ticket describing print setting in JDF, and print data. The print setting includes information such as designation of a sheet to be printed and designation of a printer for print. The print data is data of a document to be printed, and includes data of various objects such as image data, vector data (graphics data), or text data.

The image forming apparatus 10 generates a message for response or notification to the print job received from each application A, B or C, and transmits the print job to any of the applications A, B and C which transmits the message.

The image forming system 1 may be configured of a single information processing apparatus and the image forming apparatus 10, and may be operated by switching the applications A, B and C in the single information processing apparatus.

Figure 2:
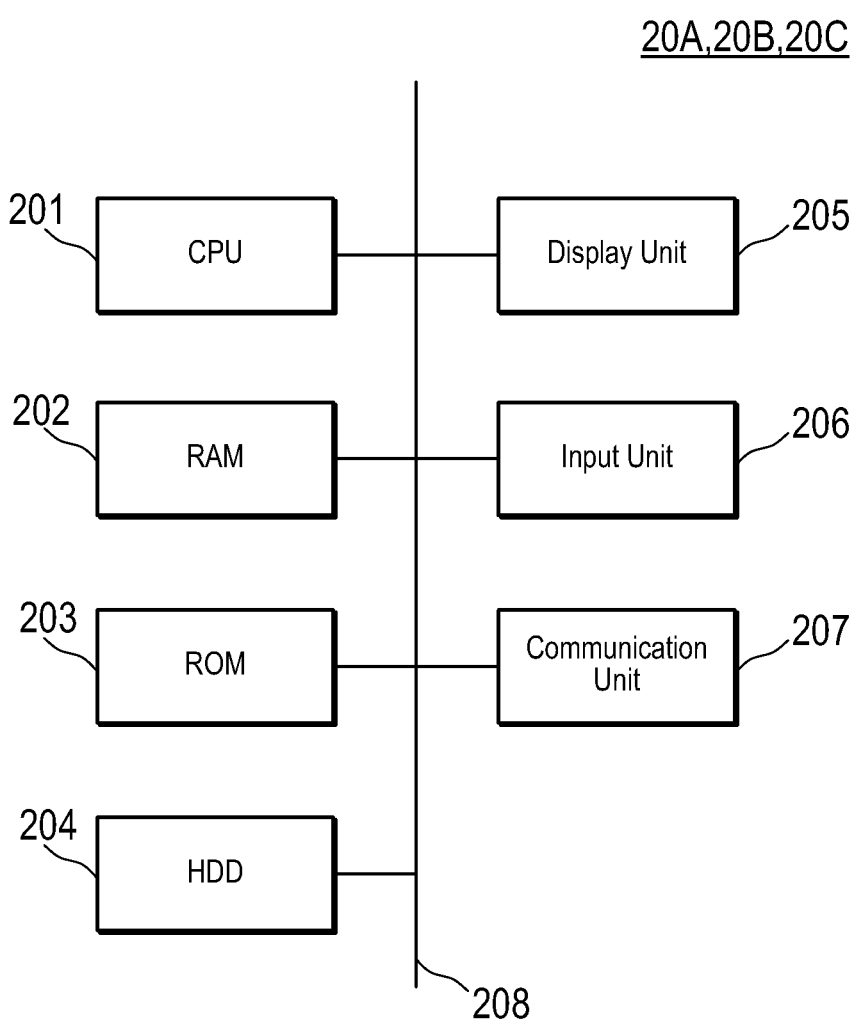
FIG. 2 is a block diagram showing a structure of each information processing apparatus.

FIG. 2 is the block diagram showing the structure of each information processing apparatus.

As illustrated in FIG. 2, each information processing apparatus 20A, 20B or 20C includes a CPU (Central Processing Unit) 201, a RAM (Random Access Memory) 202, a ROM (Read Only Memory) 203, a HDD (Hard Disk Drive) 204, a display unit 205, an input unit 206, and a communication unit 207, which are connected with each other via a bus 208 for exchanging signals.

The CPU 201 controls the respective units and performs various calculation processing according to the programs.

The RAM 202 as a working area temporarily stores programs and data.

The ROM 203 stores various programs or various data.

The HDD 204 stores the applications A, B and C, the operating system, and other programs. The HDD 204 stores print jobs, messages, and other various data.

The display unit 205 is a liquid crystal display, for example, and displays various information.

The input unit 206 includes a pointing device such as mouse, or a keyboard, and is used for various operations and inputs.

The communication unit 207 is an interface for communicating with external devices, and may use a network interface based on the standard such as Ethernet (trademark), SATA (Serial Advanced Technology Attachment), PCI Express, USB or IEEE1394, a wireless communication interface such as BLUETOOTH (trademark) or IEEE802.11, a telephone line interface for connecting to a telephone line, or the like.

Each information processing apparatus 20A, 20B or 20C operates as follows with the above structure.

The CPU 201 in each information processing apparatus 20A, 20B or 20C activates each application A, B or C stored in the HDD 204, and establishes communication between each application A, B or C and the image forming apparatus 10. Each application A, B or C generates the print job and the message associated with the print job, and transmits them to the image forming apparatus 10. The message associated with the print job is, for example a job entry message describing a job entry command and a print job storage destination URL (Uniform Resource Locator) in the information processing apparatus 20A, 20B or 20C. The image forming apparatus 10 can recognize the print job entry by receiving the job entry message, and can acquire the print job by accessing the print job storage destination URL.

Each application A, B or C receives a message for response or notification to the print job transmitted to the image forming apparatus 10 from the image forming apparatus 10. The message for response or notification to the print job is a Response message in JMF or a Signal message in JMF, for example. The message includes a message describing that the sheets set in the print job are lacking in the image forming apparatus 10.

Figure 3:
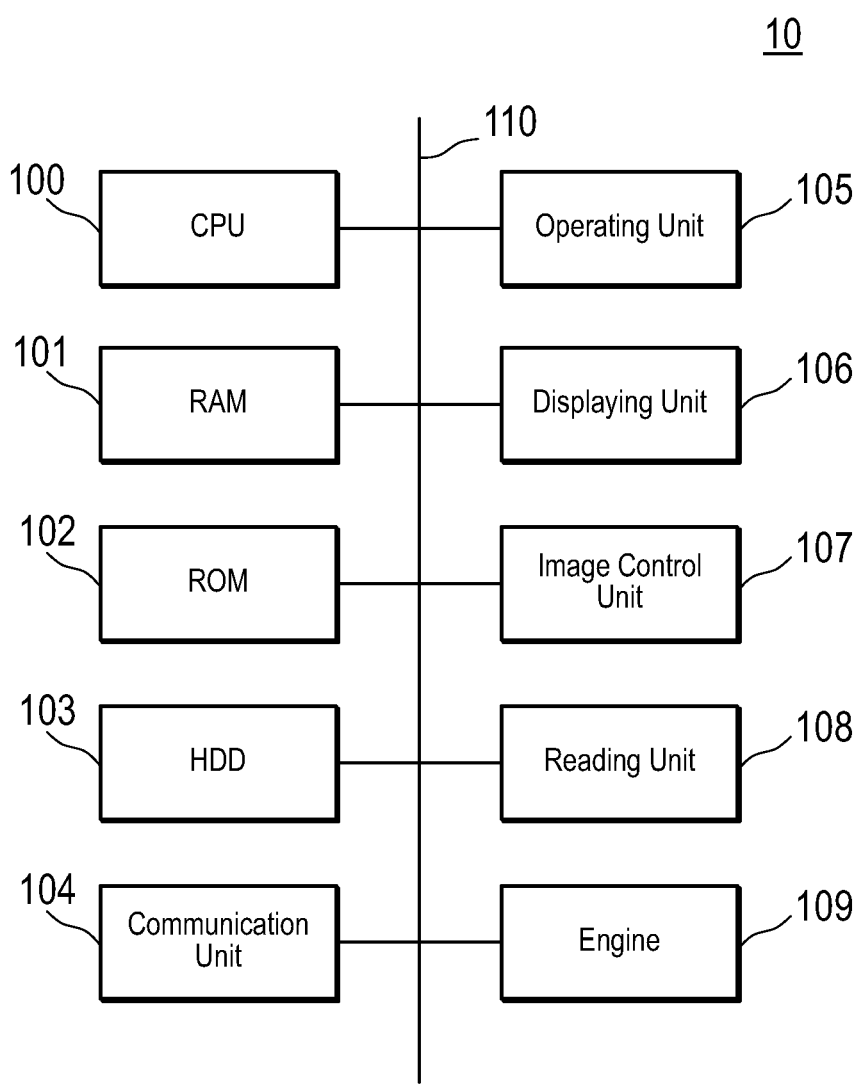
FIG. 3 is a block diagram showing a structure of an image forming apparatus.

FIG. 3 is the block diagram illustrating the structure of the image forming apparatus.

As illustrated in FIG. 3, the image forming apparatus 10 includes a CPU 100, a RAM 101, a ROM 102, a HDD 103, a communication unit 104, an operation unit 105, a display unit 106, an image control unit 107, a reading unit 108, and an engine 209. These components are connected to each other via a bus 110 for exchanging signals.

The basic structure of the image forming apparatus 10 partially overlaps with that of the information processing apparatuses 20A, 20B and 20C. Therefore, the description of the overlapping parts will be omitted or simplified.

The HDD 103 stores a program for the image forming apparatus. The program for the image forming apparatus is a program for processing the print job and the message received from the image forming apparatus 10 and generating and transmitting the message for response or notification to the print job. The HDD 103 stores the print jobs, the message, and other data.

The communication unit 104 is an interface for making communication between the image forming apparatus 10 and external devices, and employs a network interface based on the standard such as Ethernet (trademark), SATA, PCI Express, USB or IEEE1394, a local connection interface such as wireless communication interface including Bluetooth (trademark) or IEEE802.11, a telephone line interface for connecting to a telephone line, or the like.

The operation unit 105 includes a touch panel for various settings, and various fixed keys such as a numerical key for setting the number of copies, a start key for instructing to start an operation, a stop key for instructing to stop the operation, and a reset key for initializing various setting conditions.

The display unit 106 includes a touch panel for displaying various information and inputting various settings, a display lamp, and the like.

The image control unit 107 performs layout processing of the print data and rasterizes the print job so as to generate image data in a bitmap form according to the job ticket included in the print job.

The reading unit 108 irradiates a light on a document set on a predetermined reading position on a document table by a light source such as fluorescent lamp, photoelectrically converts a reflected light of the light by an image pickup device such as CCD (Charge Coupled Device) image sensor, and generates image data printable by the engine 109 from the resultant electric signal.

The engine 109 prints, on a sheet, the images based on the image data generated by the image control unit 107 and the image data generated by the reading unit 108 via the steps including charging, exposing, developing, transferring and fixing by an electrophotographic system.

The image forming apparatus 10 has the above structure so as to perform the following functions, and operate as follows.

Figure 4:
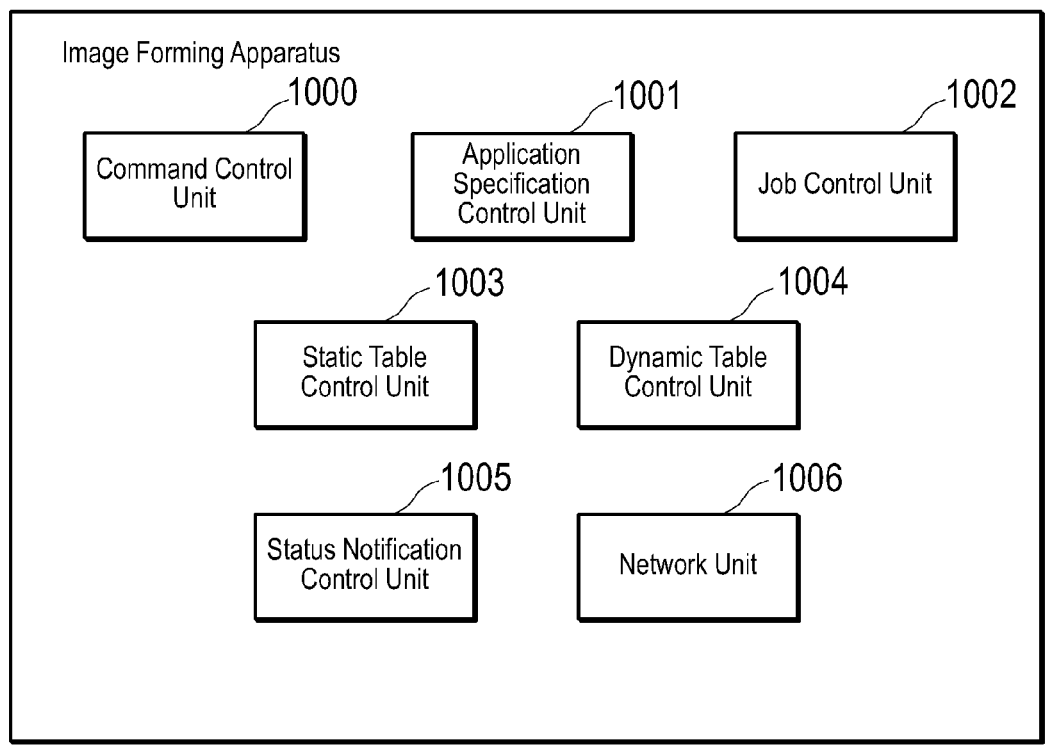
FIG. 4 is a functional block diagram showing the functions of the image forming apparatus.

FIG. 4 is a functional block diagram showing the functions of the image forming apparatus.

As shown in FIG. 4, the image forming apparatus 10 includes a command control unit 1000, an application specification control unit 1001, a job control unit 1002, a static table control unit 1003, a dynamic table control unit 1004, a status notification control unit 1005, and a network unit 1006.

The application specification control unit 1001 corresponds to a specification unit and a fourth management unit. The dynamic table control unit 1004 corresponds to a first management unit, a second management unit, and an operation unit. The static table control unit 1003 corresponds to a third management unit.

The command control unit 1000, the application specification control unit 1001, the job control unit 1002, the static table control unit 1003, the dynamic table control unit 1004, and the status notification control unit 1005 can be configured of the CPU 100, the RAM 101, the HDD 103, and the program for the image forming apparatus. The network unit 1006 may be configured of the CPU 100 and the communication unit 104.

The command control unit 1000 controls the message and the print job received from each application A, B or C and causes each of the above blocks to process the message and the like. Specifically, the command control unit 1000 causes the application specification control unit 1001 to process the message and the like thereby to specify the application A, B or C which transmits the message and the like. When the message is the job entry message, the command control unit 1000 causes the job control unit 1002 to acquire the print job from the information processing apparatus 10, and causes the dynamic table control unit 1004 to store a print job ID which is dynamic value added to the print job and to perform a print processing for the print job. The command control unit 1000 generates the message for response or notification to the print job for the specified application A, B or C, causes the dynamic table control unit 1004 to add the stored print job ID which is dynamic value as needed, and transmits the message to the application A, B or C. The dynamic value is any value assigned per print job by the applications A, B and C.

The application specification control unit 1001 specifies the application A, B or C based on the description of at least one of the print job and the message associated with the print job received from each application A, B or C. The application specification control unit 1001 uses an application specification table to specify the application which transmits the print job and the message associated with the print job. The application specification control unit 1001 stores the application specification table in the HDD 103 and manages the application specification table independently of the program for the image forming apparatus.

FIG. 5A shows the application specification table, and FIG. 5B shows an exemplary message transmitted from the information processing apparatus to the image forming apparatus.

FIG. 5A shows the application specification table.

In the application specification table, it is described that a relationship between a value (such as "VendorA") for specifying the application A included in the message and an application name (such as "VendorA") of the application A, and a path (such as JMF/@SenderID) indicating where the value is described, for example. In the application specification table, it is described that a relationship between a value (such as "VendorB") for specifying an application included in the print job and an application name (such as "VendorB") of the application B, and a path (such as "JDF/AuditPool/Created/@AgentName) indicating where the value is described, for example. The path indicates where the value for specifying the application A is described, and corresponds to the rules of describing in order to specifying the applications A, B and C.

FIG. 5B shows the exemplary message transmitted from the information processing apparatus to the image forming apparatus. The message is a Command message in which a command is described in JMF therein. The value "VendorA" for specifying the application, whose description location is indicated by the path in the application specification table, is described at the underline (1) in the message. Therefore, the application specification control unit 1001 can specify the application A, B or C which transmits the message as the application A having the application name of VendorA.

The message illustrated in FIG. 5B includes a job entry command (CommandSubmitQueueEntry) indicated by the underline (2) and the print job storage destination URL in the information processing apparatus 20A, 20B or 20C indicated by the underline (3). Therefore, the message is the job entry message.

The job control unit 1002 acquires the print job from the print job storage destination URL designated in the message by each application A, B or C specified by the application specification control unit 1001, and performs the print processing for the print job.

The static table control unit 1003 processes the print job and the message by using a static table. The static table control unit 1003 manages the static tables provided for the applications A, B and C, respectively.

FIG. 6A and FIG. 6B are the explanatory diagrams of the static tables. FIG. 6A is the explanatory diagram of the JMF static table for processing the message. FIG. 6B is the explanatory diagram of the JDF static table for processing the print job.

As shown in FIG. 6A, in the JMF static table, it is described that an operation of replacing the static value described in the message by the path "JMF/Response/DeviceInfo/@StatusDetail" indicating where the static value which is a fixed value is described with "No Paper" for the item of ResponseStatus, for example. The path is a description indicating where the static value is described, and corresponds to the rules of describing a message in JMF. The operation corresponds to an operation associated with the static value, and is described in the JMF static table by the static table control unit 1003 based on a paper-out alarm received from the engine 109, for example. The static table control unit 1003 stores the JMF static table in the HDD 103, and manages the JMF static table independently of the program for the image forming apparatus.

The static table control unit 1003 generates the message by replacing the static value (such as "Ready") described in the path designated in the JMF static table with the static value of "No Paper" by using a message template described in JMF.

FIG. 7A and FIG. 7B show the message template, and the message processed by the operation associated with the static value by the static table control unit according to the JMF dynamic table. FIG. 7A shows the message template, and FIG. 7B shows the message processed by the operation associated with the static value by the static table control unit. These messages are Response messages in JMF.

As shown in FIG. 7A and FIG. 7B, the static value "ready" described in the path designated in the JMF static table is processed by the operation associated with the static value, and thus is replaced with "No Paper" as indicated by the underline.

As shown in FIG. 6B, in the JDF static table, it is described that the operation associated with the static value described in the path "JDF/ResourceLink/ComponentLink/@CombinedProcessIndex" indicating where the static value is described in the print job, for example. The path is a description indicating where the static value is described, and corresponds to the rules of describing the message in JDF. The operation corresponds to an operation associated with the static value, and the operation is described as "if the conditions @CombinedProcessIndex=="0" and @Usage="Output" are met, the attributes and values of CombinedProcessIndex and Usage are deleted" in regard to the static value.

The static table control unit 1003 performs the operation described in the JDF static table for the print job, and thus can perform the processing adapted to each application A, B or C transmitting the print job for the print job. The static table control unit 1003 stores the JDF static tables in the HDD 103, and manages the JDF static table independently of the program for the image forming apparatus.

The dynamic table control unit 1004 processes the print job and the message by using a dynamic table. The dynamic table control unit 1004 manages the dynamic tables provided for the applications A, B and C, respectively.

FIG. 8A, FIG. 8B and FIG. 8C are the explanatory diagrams of the dynamic tables, and a table associating the job ID which is dynamic value with an internal job ID.

FIG. 8A is the explanatory diagram of the JDF dynamic table for processing the print job received by the image forming apparatus 10 when the print job is received. The dynamic table control unit 1004 manages the JDF dynamic tables provided for the applications A, B and C, respectively. The dynamic table control unit 1004 stores the JDF dynamic tables in the HDD 103, and manages the JDF dynamic tables independently of the program for the image forming apparatus.

As shown in FIG. 8A, in the JDF dynamic table, it is described that an operation of storing a value (i.e., print job ID which is dynamic value) described in the path "JDF/" indicating where the print job ID which is the dynamic value is described in the print job in the item of ResponseStatus, for example. The path is a description for indicating where the job ID which is the dynamic value is described in the print job, and corresponds to the rules of describing the print job in JDF. The operation corresponds to an operation associated with the job ID which is the dynamic value, and is described by the dynamic table control unit 1004.

FIG. 9 is the diagram illustrating the exemplary print job described in JDF.

As indicated by the underline in the print job shown in FIG. 9, the job ID "ID_A1" as the dynamic value is described in the path designated in the JDF dynamic table of FIG. 8A. Therefore, the dynamic table control unit 1004 analyzes the print job according to the JDF dynamic table so as to recognize "ID_A1" as the job ID which is the dynamic value.

The dynamic table control unit 1004 stores the job ID which is the dynamic value described in the path in the print job designated in the JDF dynamic table according to the JDF dynamic table by performing the operation associated with the dynamic value in the JDF dynamic table.

FIG. 8B is the explanatory diagram of the JMF dynamic table for processing the message for response or notification to the print job received by the image forming apparatus 10 when the message is transmitted. The dynamic table control unit 1004 manages the JMF dynamic tables provided for the applications A, B and C, respectively. The dynamic table control unit 1004 stores the JMF dynamic tables in the HDD 103, and manages the JMF dynamic tables independently of the program for the image forming apparatus.

As shown in FIG. 8B, in the JMF dynamic table, it is described that an operations to be performed in association with a value (i.e., print job ID which is dynamic value) described in the path "JDF/" indicating where the print job ID which is dynamic value is described in the print job for the item of SignalStatus, for example. The path is a description indicating where the job ID which is dynamic value is described, and corresponds to the rules of describing the print job in JDF. The operation corresponds to an operation associated with the job ID which is dynamic value, and is described in the JMF dynamic table by the dynamic table control unit 1004.

The dynamic table control unit 1004 performs an operation, designated in the JMF dynamic table, of adding the print job ID which is dynamic value to the path "JMF/Signal/DeviceInfo/" according to the JMF dynamic table for the message generated by the static table control unit 1003 according to the JMF static table, for example.

FIG. 10A and FIG. 10B show the message template, and the message processed by the operation associated with the dynamic value by the dynamic table control unit 1004 according to the JMF dynamic table. FIG. 10A shows the message template, and FIG. 10B shows the message processed by the operation associated with the print job ID which is dynamic value by the dynamic table control unit 1004 according to the JMF dynamic table. These messages are Signal message for status change notification in JMF.

As shown in FIG. 10B, the operation described in the JMF dynamic table is performed for the message template so that the print job ID "ID_A1" which is dynamic value is added to the path "JMF/Signal/DeviceInfo/."

On the other hand, when the path, the operation value, and the operation associated with the dynamic value are not present in the JMF dynamic table, the dynamic table control unit 1004 does not perform the processing of adding the print job ID which is dynamic value to the message.

In this way, the dynamic table control unit 1004 stores the job ID which is dynamic value described in the location designated by the path according to the JDF dynamic tables provided for the applications A, B and C respectively. Then, the stored job ID which is dynamic value is added to the message according to the JMF dynamic table provided for application A, B or C respectively. Thereby, also when a system for describing the dynamic value in JDF or JMF (such as "ID_A1" or "ID A1") is different for each application A, B or C and the dynamic value describing location is different, the job ID which is the dynamic value changeable per print job can be added to the message. Further, addition of the job ID which is the dynamic value to the message can be switched for each application A, B or C respectively. Therefore, the job ID which is the dynamic value is added to the message, and thus the message added with the job ID which is the dynamic value can be generated and transmitted to the application A, B or C requesting to transmit the message for the print job per print job. The message not added with the job ID which is dynamic value can be generated and transmitted to the application A, B or C not requesting to add the job ID to the message.

The command control unit 1000 transmits the message processed by the operation associated with the job ID which is dynamic value described in the JMF dynamic table to the application A, B or C specified by the application specification control unit 1001.

The dynamic table control unit 1004 may give a unique internal job ID per dynamic value when storing the print job ID which is the dynamic value according to the JDF dynamic table shown in FIG. 8A, and may store the dynamic value in combination with an internal job ID given to the dynamic value.

FIG. 8C shows the exemplary table associating the job ID which is the dynamic value with the internal job ID.

As shown in FIG. 8C, in the job ID/internal job ID association table, each value of the job ID which is the dynamic value (such as "ID_A1") is associated with the unique internal job ID (such as "1") per job ID which is the dynamic value to be stored and managed. The job ID/internal job ID association table is stored and managed in the RAM 101, for example.

The job ID which is the dynamic value is given with the internal job ID to be managed because of the following reason. That is, each application A, B or C could give the same job ID to a plurality of print jobs, or the different applications A, B and C could give overlapping job IDs to the print jobs. Therefore, the dynamic table control unit 1004 gives the internal job ID to each job ID for management, thereby discriminating the same job IDs by the internal job IDs. The dynamic table control unit 1004 determines whether a combination of the job ID which is the dynamic value specified by the application specification control unit 1001 and the internal job ID added to the job ID matches with the combination managed in the job ID/internal job ID association table. Thereby, the job IDs with overlapping job IDs are discriminated so as to discriminate the print jobs added with the overlapping job IDs. Therefore, even when the job IDs which are the dynamic values stored in the image forming apparatus 10 are overlapping, the message for response or notification to the print job can be accurately transmitted to the application A, B or C transmitting the print job.

The dynamic table control unit 1004 discriminates the job IDs by the internal job IDs stored in combination with the job IDs, thereby discriminating the print jobs added with overlapping job IDs. The message for response or notification to the print job transmitted from the application A, B or C specified by the application specification control unit 1001 is added with the job ID which is the dynamic value according to the JMF dynamic table shown in FIG. 7B.

The status notification control unit 1005 generates the message for notifying a status of the image forming apparatus 10 to a status notification URL which is URL of the information processing apparatuses 20A, 20B and 20C for being notified of the status of the image forming apparatus 10. The status notification control unit 1005 transmits the message to the application A, B or C transmitting the status notification URL to the image forming apparatus 10. The association between the status notification URL and the application A, B or C is managed by the command control unit 1000 by using the status notification URL/application association table.

FIG. 11A and FIG. 11B show the exemplary message for transmitting the status notification URL from the information processing apparatus to the image forming apparatus, and the status notification URL/application association table, respectively.

FIG. 11A shows the exemplary message for transmitting the status notification URL from the information processing apparatus 20A to the image forming apparatus 10, which is a Query message for query in JMF. The status notification URL is described in the message as indicated by the underline in the message.

FIG. 11B shows the status notification URL/application association table. The status notification URL is associated with the application name for management in the status notification URL/application association table.

The network unit 1006 receives the print job and the message from each application A, B or C in each information processing apparatus 20A, 20B or 20C under control of the command control unit 1000, and transmits the message from the image forming apparatus 10 to each application A, B or C.

Figure 12:
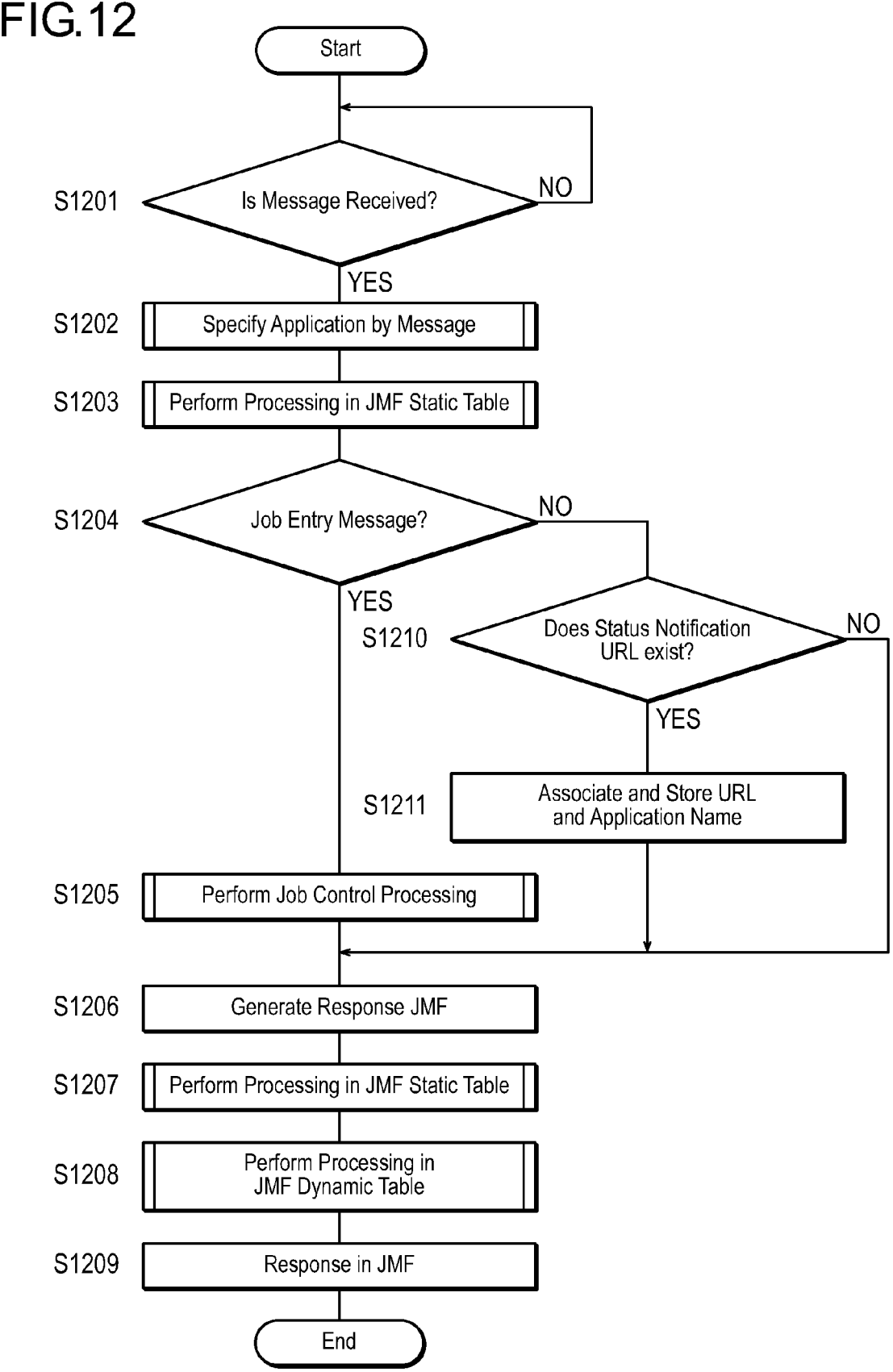
FIG. 12 is a flowchart of the communication control method in the image forming apparatus.

FIG. 12 is the flowchart of the communication control method in the image forming apparatus. The flowchart can be performed by the image forming apparatus 10 according to the program for the image forming apparatus.

When receiving the message from the application A, B or C (S1201: YES), the command control unit 1000 causes the application specification control unit 1001 to specify the application A, B or C based on the received message (S1202).

Figure 13:
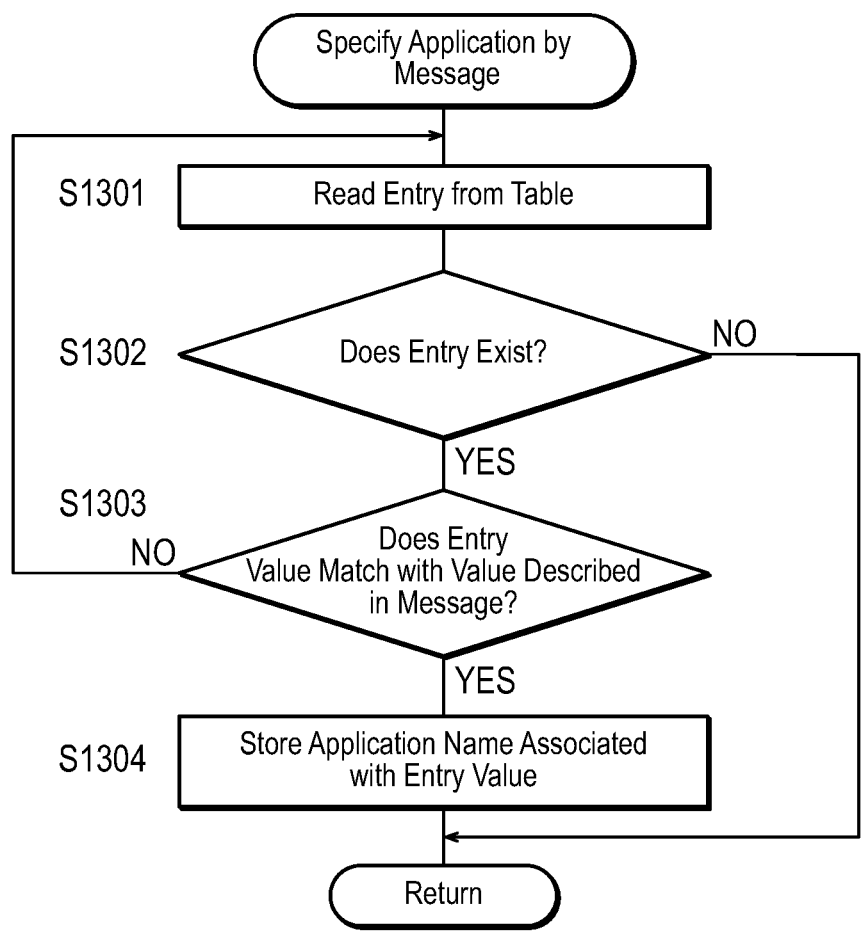
FIG. 13 is a subroutine flowchart of step S1202 in the flowchart of FIG. 12.

FIG. 13 is the subroutine flowchart of step S1202 in the flowchart of FIG. 12.

The application specification control unit 1001 reads all of paths, values and application names corresponding to the values present in the application specification table (see FIG. 5A) one by one (S1301, S1302). When an entry is not present in the application specification table (S1302: NO), the application specification control unit 1001 ends the processing.

When an entry is present in the application specification table (S1302: YES), the application specification control unit 1001 determines whether the value described in the path in the application specification table in the message matches with any one of the entry value (S1303).

When the entry value matches with the value described in the message (S1303: YES), the application specification control unit 1001 stores the application name associated with the entry value in the application specification table as the application name of the application A, B or C transmitting the message (S1304). Thereby, the application specification control unit 1001 specifies the application A, B or C transmitting the message by the application name.

Returning to FIG. 12, the command control unit 1000 causes the static table control unit 1003 to perform the processing in the JMF static table (S1203).

Figure 14:
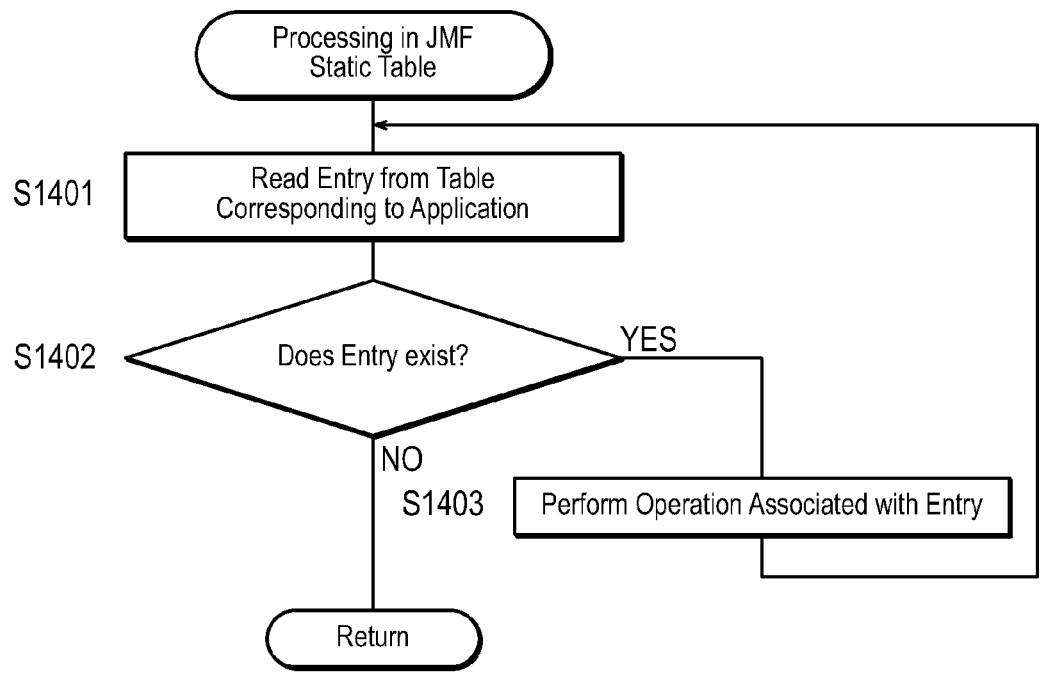
FIG. 14 is a subroutine flowchart of step S1203 in the flowchart of FIG. 12.

FIG. 14 is the subroutine flowchart of step S1203 in the flowchart of FIG. 12.

The static table control unit 1003 reads all of the paths and the operations present in the JMF static table (see FIG. 6A) corresponding to the application A, B or C specified by the application specification control unit 1001 one by one (S1401, S1402). The JMF static table corresponding to each application A, B or C is a JMF static table corresponding to the rules of describing the message in JMF of each application A, B or C. When the path and the operation are not present in the JMF static table (S1402: NO), the static table control unit 1003 ends the processing.

When the path and the operation are present in the JMF static table (S1402: YES), the static table control unit 1003 recognizes the static value from the location designated by the path in the message, and performs an operation associated with the static value (S1403).

Returning to FIG. 12, the command control unit 1000 determines whether the message is the job entry message (S1204).

When determining that the message is not the job entry message (S1204: NO), the command control unit 1000 determines whether the message includes the status notification URL (S1210). When determining that the message includes the status notification URL (S1210: YES), the command control unit 1000 stores the status notification URL in association with the application name in the status notification URL/application association table (see FIG. 11B) (S1211). When determining that the message does not include the status notification URL (S1210: NO), the command control unit 1000 performs the steps in and subsequent to step S1206.

When determining that the message is the job entry message (S1204: YES), the command control unit 1000 causes the job control unit 1002 to perform a job control processing (S1205).

Figure 15:
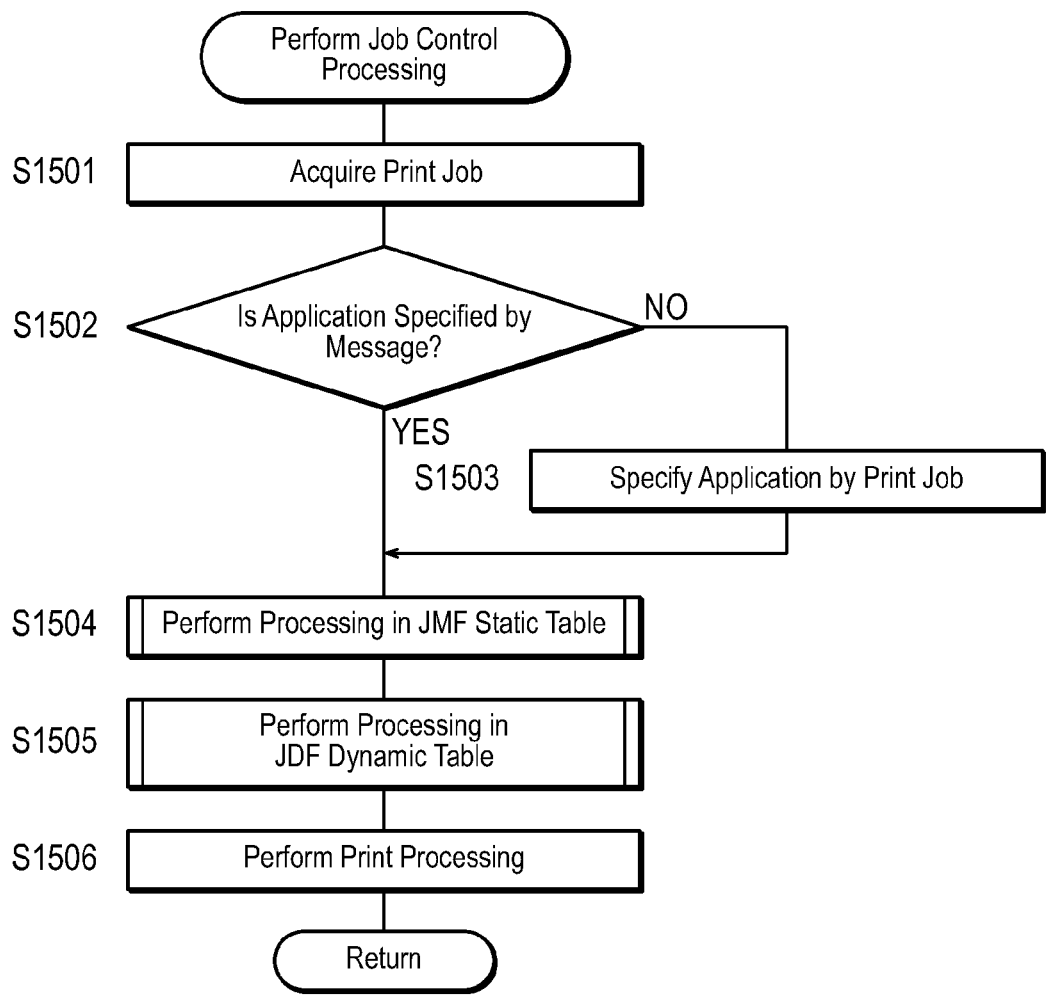
FIG. 15 is a subroutine flowchart of step S1205 in the flowchart of FIG. 12.

FIG. 15 is the subroutine flowchart of step S1205 in the flowchart of FIG. 12.

The job control unit 1002 recognizes the print job storage destination URL in the information processing apparatus 20A, 20B or 20C included in the job entry message, and acquires the print job from the URL (S1501).

The job control unit 1002 determines whether the application A, B or C is already specified by the application specification control unit 1001 based on the description of the job entry message (S1502). When determining that the application A, B or C is not specified (S1502: NO), the job control unit 1002 specifies the application A, B or C based on the description of the print job acquired in step S1501 (S1503).

When determining that the application A, B or C is specified (S1502: YES), the job control unit 1002 causes the static table control unit 1003 to perform the processing in the JMF static table (S1504). The subroutine flowchart of step S1504 is shown in FIG. 14. When the path and the operation are present in the JMF static table corresponding to the application A, B or C specified by the application specification control unit 1001 (S1401, S1402: YES), the static table control unit 1003 recognizes the static value where the description is designated in the message by the path, and performs an operation associated with the static value (S1403).

The job control unit 1002 causes the dynamic table control unit 1004 to perform the processing in the JDF dynamic table (S1505).

Figure 16:
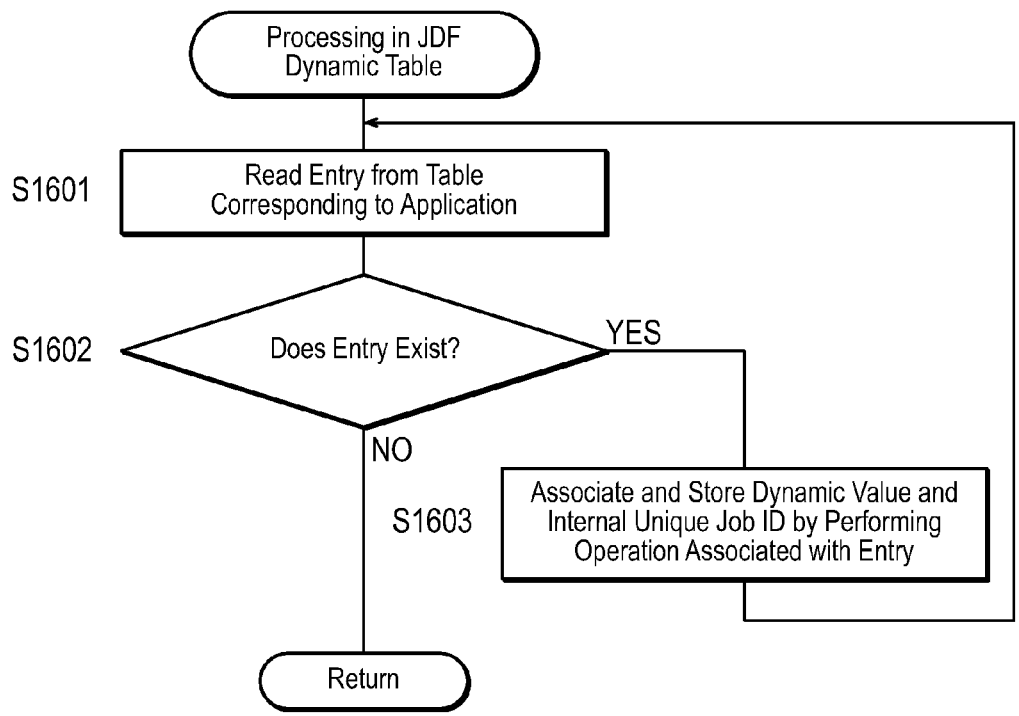
FIG. 16 is a subroutine flowchart of S1505 in the flowchart of FIG. 15.

FIG. 16 is the subroutine flowchart of step S1505 in the flowchart of FIG. 15.

The dynamic table control unit 1004 reads all of the paths and the operations present in the JDF static table (see FIG. 8A) corresponding to the application A, B or C specified by the application specification control unit 1001 one by one (S1601, S1602). The JDF dynamic table corresponding to the application A, B or C is a JDF dynamic table corresponding to the rules of describing the print job in JDF of each application A, B or C. When the entry path and the operation are not present in the JDF dynamic table (S1602: NO), the dynamic table control unit 1004 ends the processing.

When the entry path and the operation are present in the JDF dynamic table (S1602: YES), the dynamic table control unit 1004 recognizes the job ID which is the dynamic value from the location designated by the path in the message, and performs the operation associated with the job ID which is dynamic value (S1603). That is, the dynamic table control unit 1004 stores the recognized job ID which is dynamic value in association with the internal job ID (see FIG. 8A and FIG. 8C).

Returning to FIG. 15, the job control unit 1002 performs the print processing for the print job (S1506). That is, the job control unit 1002 rasterizes the print data included in the print job according to the job ticket included in the print job, and prints and outputs the print data on a sheet.

Returning to FIG. 12, the command control unit 1000 generates the message for response to the print job (S1206). The command control unit 1000 can generate the message for response to the print job by replacing or changing part of the template of the Response message in JMF, for example.

The command control unit 1000 causes the static table control unit 1003 to perform the processing in the JMF static table (S1207). The subroutine flowchart of step S1207 is illustrated in FIG. 14. When the path and the operation are present in the JMF static table corresponding to the application A, B or C specified by the application specification control unit 1001 (S1401, S1402: YES), the static table control unit 1003 recognizes the static value from the location designated by the path in the message, and performs the operation associated with the static value (S1403). The static table control unit 1003 can replace part of the message for response to the print job generated in step S1206 with the description in JMF, or perform the operation of adding the description in JMF to the message, for example.

The command control unit 1000 causes the dynamic table control unit 1004 to perform the processing in the JMF dynamic table (S1208).

Figure 17:
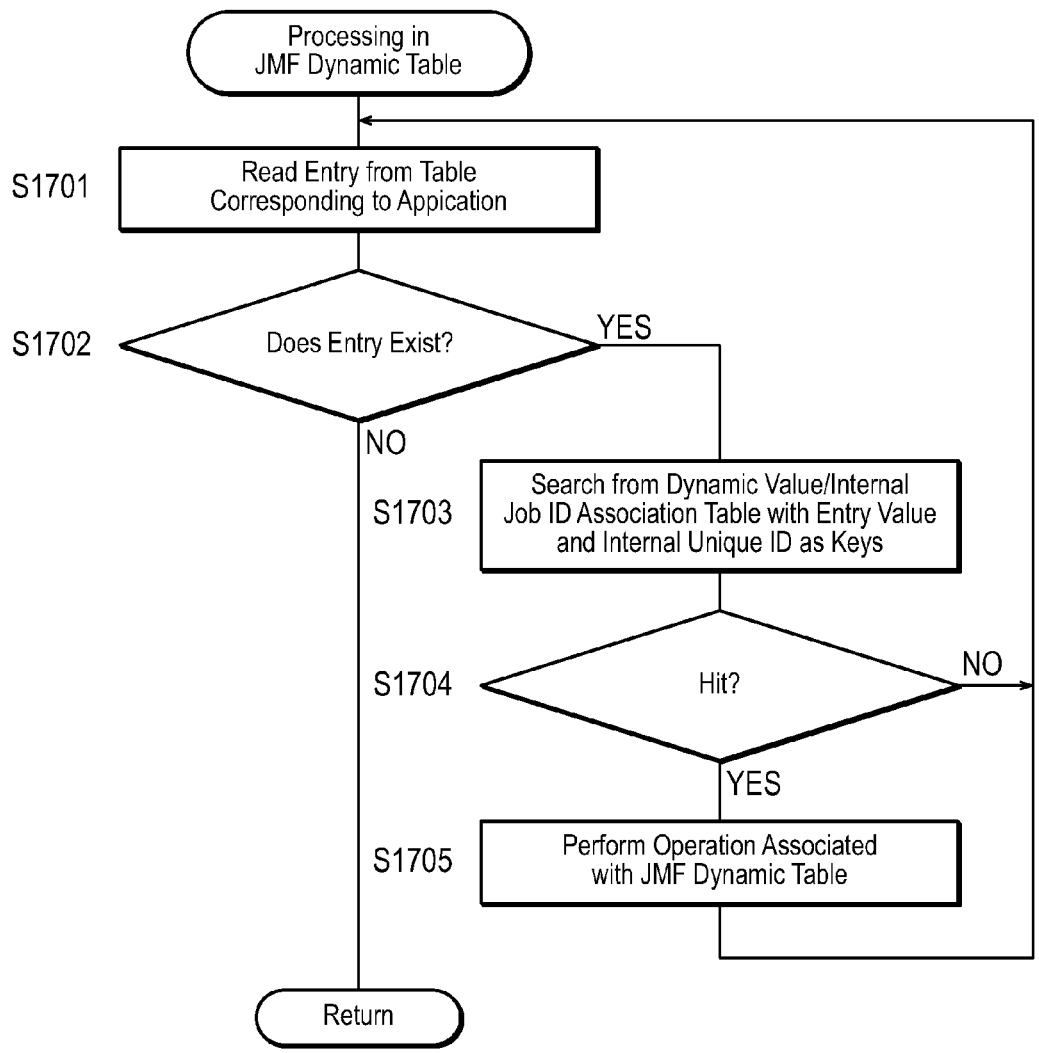
FIG. 17 is a subroutine flowchart of S1208 in FIG. 12.

FIG. 17 is the subroutine flowchart of step S1208 of FIG. 12.

The dynamic table control unit 1004 reads all of the paths and the operations in the JMF dynamic table (see FIG. 8B) corresponding to the application A, B or C specified by the application specification control unit 1001 one by one (S1701, S1702). The JMF dynamic table corresponding to the application A, B or C is a JMF dynamic table corresponding to the rules of describing a message in JMF of each application A, B or C. When the path and the operation are not present in the JMF dynamic table (S1602: NO), the dynamic table control unit 1004 ends the processing.

When the path and the operation are present in the JMF dynamic table (S1702: YES), the dynamic table control unit 1004 performs the following processing. That is, in step S1205, the job ID which is the dynamic value recognized and stored based on the path or the like is read. Then, the table associating the job ID which is the dynamic value with the internal job ID (see FIG. 8C) is searched with the job ID which is the dynamic value and the internal job ID given to the job ID as keys (S1703).

When a hit is achieved as the result of the searching in step S1703 (S1703: YES), the dynamic table control unit 1004 performs the operation associated with the job ID in the JMF dynamic table (S1705). The dynamic table control unit 1004 can perform the operation of adding the job ID which is the dynamic value to JMF/Signal/DeviceInfo/ in the message for response to the print job, which is generated in step S1206 and added with the description in JMF in step S1207.

Returning to FIG. 12, the command control unit 1000 transmits the message added with the job ID which is the dynamic value in the operation performed in step S1208 to the application A, B or C specified in step S1202, thereby making a response to the print job per print job (S1209).

Figure 18:
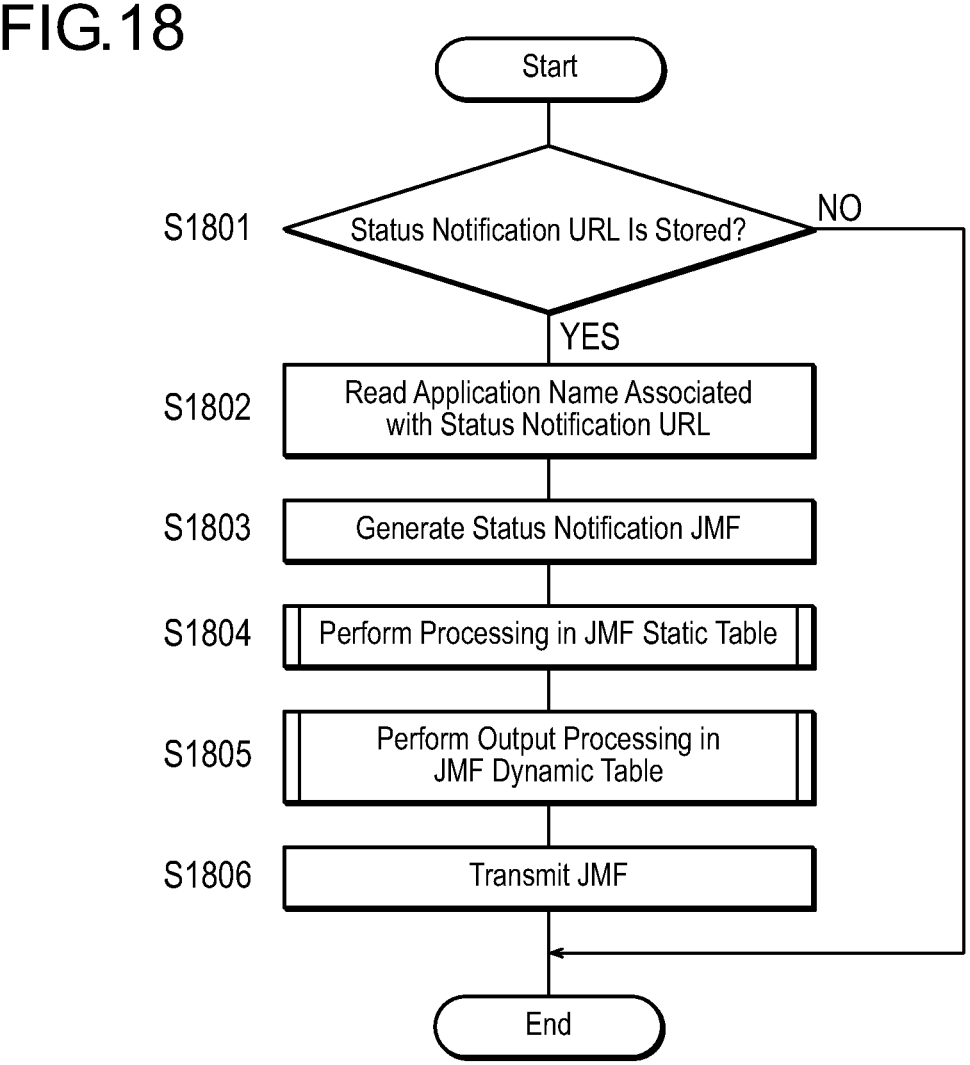
FIG. 18 is a flowchart of a communication control method performed by a status notification control unit.

FIG. 18 is the flowchart of the communication control method performed by the status notification control unit.

The status notification control unit 1005 determines whether the status notification URL is stored in the image forming apparatus 10 under control of the command control unit 1000 (S1801). When determining that the status notification URL is not stored (S1801: NO), the status notification control unit 1005 ends the processing.

When determining that the status notification URL is stored (S1801: YES), the status notification control unit 1005 reads the application name stored in association with the status notification URL (S1802). The status notification URL and the application name are associated with each other and stored in step S1211 by the command control unit 1000.

The status notification control unit 1005 generates the Signal message in JMF which is a message for status change notification to be transmitted to the application A, B or C (S1803).

The status notification control unit 1005 causes the static table control unit 1003 to perform the processing in the JMF static table (S1804). The subroutine flowchart of step S1804 is shown in FIG. 14. When the path and the operation are present in the JMF static table corresponding to the application A, B or C specified by the application specification control unit 1001 (S1401, S1402: YES), the static table control unit 1003 recognizes the static value from the location designated by the path in the message generated in step S1803, and performs the operation associated with the static value (S1403). The static table control unit 1003 can replace part of the message generated in step S1803 with the description in JMF, or perform the operation of adding the description in JMF to the message, for example.

The status notification control unit 1005 causes the dynamic table control unit 1004 to perform the processing in the JMF dynamic table (S1805). The subroutine flowchart of step S1805 is shown in FIG. 17. When an entry is present in the JMF dynamic table corresponding to the application A, B or C specified by the application specification control unit 1001 (S1701, S1702: YES), the dynamic table control unit 1004 performs the operation associated with the job ID in the JMF dynamic table (S1705). In other words, the dynamic table control unit 1004 can perform the operation of adding the job ID which is dynamic value to JMF/Signal/DeviceInfo/ in the message processed in the JMF static table in step S1403, for example.

The status notification control unit 1005 transmits the message added with the job ID which is dynamic value in step S1805 to each application A, B or C with the application name read in step S1802 (S1806).

The present embodiment has the following effects.

An application is specified based on a print job transmitted by any of a plurality of applications, and the rules of describing the print job for the dynamic value added to the print job are managed together with operations associated with the dynamic value per application. The print job is analyzed according to the rules managed for the specified application, so that the dynamic value is recognized and the associated operations are performed for the recognized dynamic value. Thereby, addition of the dynamic value such as job ID to the message in JMF can be rapidly and easily switched per application which transmits the print job without correcting software in the image forming apparatus.

Further, the unique internal job ID is given to each dynamic value to be stored and managed. When the message for response to the print job is transmitted per specified application, if the combination of the dynamic value recognized from the print job and the internal job ID given to the dynamic value matches with the managed combination of the dynamic value and the internal job ID, the dynamic value is added to the message. Thereby, even if the stored dynamic values are overlapping, the message for response to the print job can be accurately transmitted to the application which transmits the print job per print job.

Further, the rules of describing the message for the static value which is fixed value are managed per application together with operations associated with the static value. When the message for response to the print job is transmitted per specified application, the operations managed for the specified application are performed according to the rules. Thereby, the processing of adding, replacing and deleting the static value can be performed for the message to be transmitted to the application, with corresponding to the application which transmits the print job without correcting the software in the image forming apparatus.

Further, the association between the rules of describing the print job or the like in order to specify the application and an application is managed. The management of the dynamic value and operation associated with the dynamic value, the management of the static value and operation associated with the static value, and the management of the rules of describing the print job or the like and application associated with the rule are stored in a non-volatile storage medium to be independently made. Thereby, the managements are enabled independently of the program for the image forming apparatus, and thus addition of the dynamic value can be easily switched per application which transmits the print job without correcting the software in the image forming apparatus.

The communication control method in the image forming system, the storage medium stored with the program for the image forming system, and the image forming system according to the embodiment of the present invention have been described above, but the present invention is not limited to the embodiment.

For example, there has been described, in the above embodiment, that the dynamic table and the static table are managed in the image forming apparatus. However, the dynamic table and the static table may be managed in the server provided in the image forming system. Thereby, when the image forming apparatus transmits and receives a print job and a message to and from each application, the tables are downloaded from the server for use as needed, and thus the tables can be managed in an integrated fashion, thereby easily dealing with the newly-added application.

The above embodiment has been described by use of a job ID as dynamic value, but the dynamic value may take any value assigned per print job and is not limited to the job ID.

Further, part or all of the functions realized by the program in the above embodiment may be replaced with hardware such as circuit to be accomplished.

What is claimed is:

1. A communication control method in an image forming system which comprises a plurality of applications and an image forming apparatus and in which at least a print job described in JDF code is transmitted from said applications to said image forming apparatus and a message described in JMF code is exchanged between said applications and said image forming apparatus, said method comprising the steps of:
    (a) specifying an application based on a description of said print job and said message associated with said print job, transmitted from any of said applications to said image forming apparatus;
    (b) managing rules of describing said print job for dynamic value including any values assigned per print job, which is added to said print job, per application together with operations associated with said dynamic value;
    (c) recognizing said dynamic value by analyzing said print job according to said rules managed in said step (b) for said application specified in said step (a) for said print job, and performing said operations associated with said dynamic values managed in said step (b) for said recognized dynamic value; and
    (d) managing said dynamic value recognized in said step (c),
    wherein said operations performed in said step (c) comprise:
    an operation of, when at least one of said print job and said message associated with said print job is received by said image forming apparatus, storing and managing said dynamic values recognized in said step (c) in said step (d); and
    an operation of, when said message for response or notification to said print job is transmitted to said application specified in said step (a), adding said dynamic values managed in said step (d) to said message to said print job.

2. The communication control method in the image forming system as claimed in claim 1,
    wherein a unique internal job ID is further given to each of said dynamic values recognized in said step (c) and said dynamic values are managed in combination with said internal job IDs given to said dynamic values in step (d), and
    wherein said operations performed in said step (c) comprise:
    an operation of, when at least one of said print job and said message associated with said print job is received by said image forming apparatus, storing and managing said dynamic value recognized in said step (c) in combination with said internal job ID in said step (d); and
    an operation of, when said message for response or notification to said print job is transmitted to said application specified in said step (a), adding said dynamic value to said message to said print job when a combination of said dynamic value recognized from said print job and said internal job ID given to said dynamic value matches with said combination managed in said step (d).

3. The communication control method in the image forming system as claimed in claim 1, further comprising:
    a step (e) of managing rules of describing said message for static value which is fixed value per application together with operation associated with said static value,
    wherein when said message for response or notification to said print job is transmitted to said application specified in said step (a), said operations managed in said step (e) for said specified application are further performed according to said rules in said step (c).

4. The communication control method in the image forming system as claimed in claim 3, further comprising:
- a step (f) of managing an association between rules of describing said print job or said message associated with said print job in order to specify said application and said application,
- wherein at least one of said print job and said message associated with said print job is analyzed according to said rules managed in said step (f) so as to specify said application in said step (a), and
- said rules and said operations are stored and independently managed in a non-volatile storage medium in said step (b), said step (e) and said step (f).

5. A non-transitory computer readable storage medium stored with a program, said program causing an image forming system which comprises a plurality of applications and an image forming apparatus and in which at least a print job described in JDF code can be transmitted from said applications to said image forming apparatus and a message described in JMF code can be exchanged between said applications and said image forming apparatus to execute a process comprising the steps of:
- (a) of specifying an application based on a description of said print job and said message associated with said print job transmitted from any of said applications to said image forming apparatus;
- (b) of managing rules of describing said print job for dynamic values including any values assigned per print job, which is added to said print job, per application together with operations associated with said dynamic value;
- (c) of recognizing said dynamic value by analyzing said print job according to said rules managed in said step (b) for said application specified in said step (a) for said print job, and performing said operations associated with said dynamic value managed in said step (b) for said recognized dynamic value; and
- (d) managing said dynamic value recognized in said step (c), and
- said operations performed in said step (c) comprise:
- an operation of, when at least one of said print job and said message associated with said print job is received by said image forming apparatus, storing and managing said dynamic value recognized in said step (c) in said step (d); and
- an operation of, when said message for response or notification to said print job is transmitted to said application specified in said step (a), adding said dynamic value managed in said step (d) to said message to said print job.

6. The non-transitory computer readable storage medium stored with a program as claimed in claim 5,
- wherein a unique internal job ID is further given to each of said dynamic values recognized in said step (c) and said dynamic values are managed in combination with said internal job IDs given to said dynamic values in said step (d), and
- said operations performed in said step (c) comprise:
- an operation of, when at least one of said print job and said message associated with said print job is received by said image forming apparatus, storing and managing said dynamic values recognized in said step (c) in combination with said internal job IDs in said step (d), and
- an operation of, when said message for response or notification to said print job is transmitted to said application specified in said step (a), adding said dynamic value to said message to said print job when a combination of said dynamic value recognized from said print job and said internal job ID given to said dynamic value matches with said combination managed in said step (d).

7. The non-transitory computer readable storage medium stored with a program as claimed in claim 5,
- wherein said process further comprise a step (e) of managing rules of describing said message for static values as fixed values per application together with operation associated with said static value, and
- wherein when said message for response or notification to said print job is transmitted to said application specified in said step (a), said operations managed in said step (e) are further performed for said specified application according to said rules in said step (c).

8. The non-transitory computer readable storage medium stored with the program as claimed in claim 7,
- wherein said process further comprise a step (f) of managing an association between rules of describing said print job or said message associated with said print job in order to specify said application and said application,
- at least one of said print job and said message associated with said print job is analyzed according to said rules managed in said step (f) thereby to specify said application in said step (a), and
- said rules and said operations are stored and independently managed in a non-volatile storage medium in said step (b), said step (e) and said step (f).

9. An image forming system which comprises a plurality of applications and an image forming apparatus and in which at least a print job described in JDF code can be transmitted from said applications to said image forming apparatus and a message described in JMF code can be exchanged between said applications and said image forming apparatus, said system comprising:
- a specification unit for specifying an application based on a description of said print job and said message associated with said print job, transmitted from any of said applications to said image forming apparatus;
- a first management unit for managing rules of describing said print job for dynamic value including any values assigned per print job, which is added to said print job, per application together with operations associated with said dynamic value;
- an operation unit for recognizing said dynamic value by analyzing said print job according to said rules managed in said first management unit for said application specified by said specification unit for said print job, and performing said operations associated with said dynamic value managed in said first management unit for said recognized dynamic value; and
- a second management unit for managing said dynamic value recognized by said operation unit;
- wherein said operations performed by said operation unit comprise:
- an operation of, when at least one of said print job and said message associated with said print job is received by said image forming apparatus, storing and managing said dynamic value recognized by said operation unit in said second management unit; and
- an operation of, when said message for response or notification to said print job is transmitted to said application specified by said specification unit, adding said dynamic value managed in said second management unit to said message to said print job.

10. The image forming system as claimed in claim 9,
- wherein said second management unit further gives a unique internal job ID to each of said dynamic values recognized by said operation unit, and manages said dynamic values in combination with said internal job IDs given to said dynamic values, and wherein said operations performed by said operation unit comprise:

an operation of, when at least one of said print job and said message associated with said print job is received by said image forming apparatus, storing and managing said dynamic value recognized by said operation unit in said second management unit in combination with said internal job ID; and an operation of, when said message for response or notification to said print job is transmitted to said application specified by said specification unit, adding said dynamic value to said message to said print job when a combination of said dynamic value recognized from said print job and said internal job ID given to said dynamic value matches with said combination managed in said second management unit.

11. The image forming system as claimed in claim 9, further comprising:

a third management unit for managing rules of describing said message for static value which is fixed value per application together with operation associated with said static value, wherein when said message for response or notification to said print job is transmitted to said application specified in said specification unit, said operation unit further performs said operations managed in said third management unit for said specified application according to said rules.

12. The image forming system as claimed in claim 11, further comprising:

a fourth management unit for managing an association between rules of describing said print job or said message associated with said print job in order to specify said application and said application, wherein said specification unit specifies said application by analyzing at least one of said print job and said message associated with said print job according to said rules managed in said fourth management unit, and said first management unit, said third management unit and said fourth management unit store and independently manage said rules and said operations in a non-volatile storage medium.

\* \* \* \* \*